UNITED STATES PATENT OFFICE.

B. S. FOREMAN, OF MORRISON, ILLINOIS.

IMPROVED METHOD OF PRESERVING WOOD, RAILROAD-TIES, &c.

Specification forming part of Letters Patent No. 43,191, dated June 21, 1864; Reissue No. 1,951, dated May 9, 1865.

*To all whom it may concern:*

Be it known that I, B. S. FOREMAN, of Morrison, in the county of Whiteside and State of Illinois, have invented a new and improved mode of preserving wood in a sound condition, and preventing the same from rotting, preventing grubs and insects from working in it, and preventing it from taking fire, and cause the wood to hold all spikes and nails, and harden the timber. I do hereby declare that the following is a full and exact statement of the material used and description thereof, and full and exact direction for applying the same to all wood materials for the purposes herein set forth.

The nature of my invention consists in providing wood materials with an aperture at all places liable to rot, &c., and put therein a composition of salt, corrosive sublimate, and arsenic, which prevents them from rotting, as herein set forth.

To enable others to use my invention, I will describe the composition and the manner of applying it more fully.

I take the wood material I wish to preserve and at or near the points liable to rot, &c., I bore a hole in the upper or face side two inches in diameter, smaller or larger according to the size of the timber, and five inches deep, more or ress, according to the size, &c. In the aperture I put a composition of the following ingredients and in the following proportion, viz: three ounces of arsenic and three ounces of corrosive sublimate to one pound of salt. After having filled the hole with the composition I insert a plug of wood one inch in thickness, the grain of the wood in the plug to run parallel with the grain of the wood in the timber, and I drive it firmly down in. In long timbers I insert the composition from one foot to eight feet apart, as herein set forth.

This compound will prevent wood from rotting, prevent grubs and insects from working in it, prevent it from taking fire, and hold all spikes and nails in their proper places, and harden the timber.

What I claim as my invention, and desire to secure by Letters Patent, is—

The application to all wood materials liable to rot or take fire, be eaten with grubs or insects, a composition made of the materials and applied as and for the purposes herein set forth.

B. S. FOREMAN.

Witnesses:
M. D. HIGLY,
A. J. JACKSON.